United States Patent
Wavra et al.

(10) Patent No.: US 8,388,361 B2
(45) Date of Patent: Mar. 5, 2013

(54) PORTABLE STORAGE DEVICE WITH RETRACTABLE CONNECTOR

(75) Inventors: Robert Edward Wavra, Flemington, NJ (US); Jose Luis Pluchino, Budd Lake, NJ (US)

(73) Assignee: PNY Technologies, Inc., Parsippany, NJ (US)

( * ) Notice: Subject to any disclaimer, the term of this patent is extended or adjusted under 35 U.S.C. 154(b) by 0 days.

(21) Appl. No.: 12/838,698

(22) Filed: Jul. 19, 2010

(65) Prior Publication Data
US 2012/0015534 A1 Jan. 19, 2012

(51) Int. Cl.
*H01R 13/44* (2006.01)
(52) U.S. Cl. ......................... 439/131; 439/136
(58) Field of Classification Search .................. 439/131, 439/136; 361/679.31; 235/492
See application file for complete search history.

(56) References Cited

U.S. PATENT DOCUMENTS

| | | | |
|---|---|---|---|
| D444,788 S | 7/2001 | Do et al. | |
| D463,426 S | 9/2002 | Cheng | |
| 6,480,390 B2 | 11/2002 | Matsumiya et al. | |
| 6,612,853 B2 | 9/2003 | Wu | |
| 6,743,030 B2 | 6/2004 | Lin et al. | |
| 6,763,410 B2 | 7/2004 | Yu | |
| 6,880,054 B2 | 4/2005 | Cheng et al. | |
| 6,890,188 B1 | 5/2005 | Le | |
| 6,894,865 B2 | 5/2005 | Chang et al. | |
| 6,926,544 B2 | 8/2005 | Lee | |
| 6,932,629 B2 | 8/2005 | Ikenoue | |
| 6,963,468 B2 | 11/2005 | Chang et al. | |
| 6,979,210 B2 | 12/2005 | Regen et al. | |
| 7,004,780 B1 | 2/2006 | Wang | |
| 7,025,275 B2 | 4/2006 | Huang et al. | |
| D520,995 S | 5/2006 | Chang | |
| 7,039,759 B2 | 5/2006 | Cheng et al. | |
| D524,814 S | 7/2006 | Kent et al. | |
| 7,070,425 B2 | 7/2006 | Regen et al. | |
| 7,082,483 B2 | 7/2006 | Poo | |
| 7,090,515 B2 | 8/2006 | Regen et al. | |
| 7,092,256 B1 | 8/2006 | Salazar et al. | |

(Continued)

FOREIGN PATENT DOCUMENTS

CN ZL200920156532.9 5/2010
CN ZL200930181478.9 5/2010

(Continued)

OTHER PUBLICATIONS

"SanDisk Cruzer with 256 MB Digital Memor," first available at Amazon.com on Aug. 1, 2002, printout from http://www.amazon.com/SanDisk-Cruzer-Secure-Digital-Memory/dp/B00006HCHH (8 pages).

(Continued)

*Primary Examiner* — Hien Vu
(74) *Attorney, Agent, or Firm* — McCarter & English, LLP (57) ABSTRACT

A thumb drive includes a retractable USB connector sized to translate between an extended position beyond a housing and a retracted position into the housing. An actuator, such as a dial or a lever, is sized to actuate the USB connector to move the USB connector between the extended position and the retracted position. The USB connector is sized to translate to the extended position when the actuator is moved in one direction. The USB connector is sized to translate to the retracted position when the actuator is moved in an opposite direction.

9 Claims, 7 Drawing Sheets

U.S. PATENT DOCUMENTS

| | | | |
|---|---|---|---|
| 7,146,667 B2 | 12/2006 | Elsener | |
| 7,264,992 B2 | 9/2007 | Hsueh et al. | |
| 7,269,004 B1 | 9/2007 | Ni et al. | |
| 7,275,941 B1 | 10/2007 | Bushby | |
| D556,195 S | 11/2007 | Lin | |
| D556,197 S | 11/2007 | Blankenship et al. | |
| 7,295,431 B2 | 11/2007 | Chuang | |
| 7,296,345 B1 | 11/2007 | Wang et al. | |
| 7,297,024 B2 | 11/2007 | Ni et al. | |
| D556,751 S | 12/2007 | Rambosek et al. | |
| 7,361,032 B2 | 4/2008 | Loftus | |
| 7,394,661 B2 | 7/2008 | Wang et al. | |
| D580,434 S | 11/2008 | Kim | |
| 7,451,262 B2 | 11/2008 | Yetukuri | |
| D581,926 S | 12/2008 | Kim | |
| 7,462,044 B1 | 12/2008 | Regen et al. | |
| 7,466,556 B2 | 12/2008 | Hiew et al. | |
| 7,473,112 B2 | 1/2009 | Zhu et al. | |
| 7,500,858 B2 | 3/2009 | Emerson et al. | |
| 7,530,823 B1 | 5/2009 | Thornton et al. | |
| D594,871 S | 6/2009 | Ma | |
| 7,544,073 B2 | 6/2009 | Nguyen et al. | |
| 7,547,218 B2 | 6/2009 | Hiew et al. | |
| 7,549,875 B2 | 6/2009 | Rambosek et al. | |
| 7,558,069 B2 | 7/2009 | Chung | |
| 7,558,070 B2 * | 7/2009 | Kang | 361/752 |
| 7,566,231 B2 | 7/2009 | Regen et al. | |
| 7,586,460 B2 | 9/2009 | Hunt et al. | |
| D602,026 S | 10/2009 | Lo | |
| D602,941 S | 10/2009 | Lo | |
| D606,078 S | 12/2009 | Chen | |
| 7,632,113 B2 * | 12/2009 | Finn | 439/131 |
| D607,433 S | 1/2010 | Drori et al. | |
| D610,157 S | 2/2010 | Ma | |
| 7,699,630 B2 | 4/2010 | Kim | |
| 7,713,074 B2 | 5/2010 | Poo et al. | |
| 7,747,003 B2 | 6/2010 | Regen et al. | |
| 7,758,359 B2 * | 7/2010 | Chiu et al. | 439/131 |
| D622,278 S | 8/2010 | Ma | |
| D622,279 S | 8/2010 | Ma | |
| 7,794,246 B2 | 9/2010 | Cheng | |
| 7,811,102 B2 * | 10/2010 | Lai | 439/131 |
| 7,894,198 B2 * | 2/2011 | Zhu et al. | 361/755 |
| 2002/0095389 A1 | 7/2002 | Gaines | |
| 2003/0144608 A1 | 7/2003 | Kojima et al. | |
| 2004/0074264 A1 | 4/2004 | Kung et al. | |
| 2005/0130469 A1 | 6/2005 | Ikenoue | |
| 2006/0131431 A1 | 6/2006 | Finn | |
| 2006/0240692 A1 | 10/2006 | Regen et al. | |
| 2008/0019090 A1 | 1/2008 | Zhu et al. | |
| 2008/0026614 A1 | 1/2008 | Emerson et al. | |
| 2008/0032561 A1 | 2/2008 | Hiew et al. | |
| 2008/0050952 A1 | 2/2008 | Regen et al. | |
| 2008/0094807 A1 | 4/2008 | Hiew et al. | |
| 2008/0191030 A1 | 8/2008 | Ma et al. | |
| 2008/0232060 A1 | 9/2008 | Yu et al. | |
| 2008/0261449 A1 | 10/2008 | Ni et al. | |
| 2008/0276099 A1 | 11/2008 | Nguyen et al. | |
| 2008/0288697 A1 | 11/2008 | Kim | |
| 2008/0298578 A1 | 12/2008 | Regen et al. | |
| 2009/0061696 A1 | 3/2009 | Lin et al. | |
| 2009/0258516 A1 | 10/2009 | Hiew et al. | |
| 2010/0075517 A1 | 3/2010 | Ni et al. | |
| 2010/0124831 A1 | 5/2010 | Chou et al. | |
| 2010/0304586 A1 | 12/2010 | Ma | |
| 2010/0328874 A1 | 12/2010 | Ko | |
| 2011/0013354 A1 | 1/2011 | Huang | |

FOREIGN PATENT DOCUMENTS

| | | |
|---|---|---|
| CN | ZL200930187733.0 | 10/2010 |
| JP | 2001022897 | 1/2001 |
| TW | M352748 | 3/2009 |
| TW | M368821 | 11/2009 |
| TW | D134370 | 4/2010 |
| TW | D134845 | 5/2010 |

OTHER PUBLICATIONS

"SanDisk Micro USB Flash Drive" printout from http://www.sandisk.com, printed on Apr. 8, 2009 (3 pages).

"SanDisk® Cruzer® USB Flash Drive (New Design!)" printout from http://www.sandisk.com, printed on Apr. 8, 2009 (2 pages).

"Trek—Thumbdrive® Portable Data Storage Device" product data sheet available at least as early as Sep. 11, 2006 (1 page).

"Netac OnlyDisk" printout from http://www.pchardware.co.uk/onlydisk.php, Nov. 2003 (9 pages).

"MacHASP USB" product description sheets owned by Aladdin, available at least as early as Dec. 18, 2006 (10 pages).

"A Very Small Floppy—the Only Disc," vol. 38, Section F, Uniform Domestic Periodical No. CN11-0132, China Computerworld, Oct. 4, 1999 (4 pages).

Notification of Correction issued on Nov. 25, 2009, from the State Intellectual Property Office in connection with Chinese Application No. 200930187733.0, now Chinese Patent No. ZL200930187733.0 (1 page).

Design Registration No. 300503920.0000 (Korea), filed on Jul. 22, 2008, registered on Aug. 25, 2008, Locarno Class 14-02 (3 pages).

Design Registration No. 300500238.0000 (Korea), filed on Nov. 28, 2008, registered on Jul. 23, 2008, Locarno Class 14-02 (2 pages).

Design Registration No. 300414236.0000 (Korea), filed on Jul. 28, 2005, registered on May 8, 2006, Locarno Class 14-02 (2 pages).

10 Stupid and/or Cool USB Flash Drives: EveryJoe—Sports News—Tech Reviews—Entertainment—Life Tips for EveryJoe, (online) posted on Nov. 2, 2009 (retrieved on Nov. 2, 2009). Retrieved from the Internet: http://www.everyjoe.com/articles/10-stupid-andor-cool-usb-fiash-drives (11 pages).

Notice of Allowance dated May 26, 2010 from U.S. Appl. No. 29/311,791 (6 pages).

Notice of Allowance dated May 26, 2010 from U.S. Appl. No. 29/311,792 (6 pages).

Office Action dated Mar. 30, 2011 from U.S. Appl. No. 29/365,924 (7 pages).

European Search Report dated Feb. 9, 2012, issued by the European Patent Office in connection with European Patent Application No. 11156411.8-1229 (7 pages).

* cited by examiner

PORTABLE STORAGE DEVICE WITH RETRACTABLE CONNECTOR

FIELD OF THE INVENTION

The present invention relates to a portable storage device, and more particularly, to an universal serial bus (USB) portable drive with a retractable connector.

BACKGROUND OF THE INVENTION

USB portable drives are used to store information. The USB portable drive is inserted into a USB connector of a computer or other host system to transfer data between the USB portable drive and the computer.

These USB portable drives typically include an outer housing and an USB connector that extends beyond the outer housing. A separate cover is removably secured to the outer housing. The separate cover is provided to protect the USB connector when the USB connector is not in use. These covers are often plastic caps that are easily removed from the USB connector. Such caps are commonly misplaced by users when the USB connector is in use.

Accordingly, it would be desirable to provide a USB portable drive which protects the USB connector while not in use without the need for a separate cover.

SUMMARY OF THE INVENTION

The present invention relates to a thumb drive that includes a retractable USB connector sized to translate between an extended position beyond a housing and a retracted position into the housing. An actuator, such as a dial or a lever, is sized to actuate the USB connector to move the USB connector between the extended position and the retracted position. The USB connector is sized to translate to the extended position when the actuator is moved in one direction. The USB connector is sized to translate to the retracted position when the actuator is moved in an opposite direction.

The USB connector is configured for linear motion between a first position and a second position. The USB connector is induced to move in a linear direction in response to motion of the actuator.

BRIEF DESCRIPTION OF THE DRAWINGS

For a more complete understanding of the present invention, reference is made to the following Detailed Description of the Invention, considered in conjunction with the accompanying drawings, in which.

DETAILED DESCRIPTION OF THE INVENTION

The present invention is described in connection with a thumb drive adapted to store information. It should be understood, however, that the present invention can be used with other portable data storage devices, such as a flash drive, integrated with a USB interface.

Figure 1:
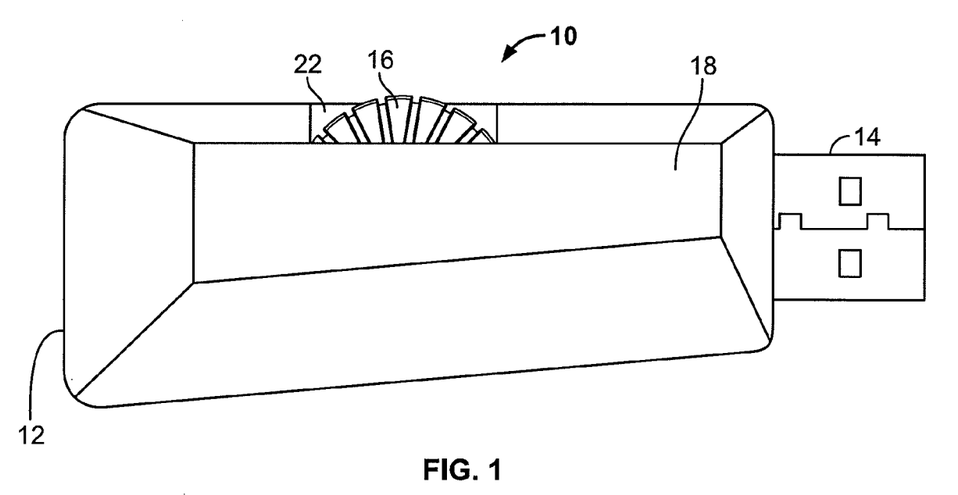
FIG. 1 is a rear view of a thumb drive according to the present invention, a USB connector being shown in an extended position beyond the outer housing.
Figure 2:
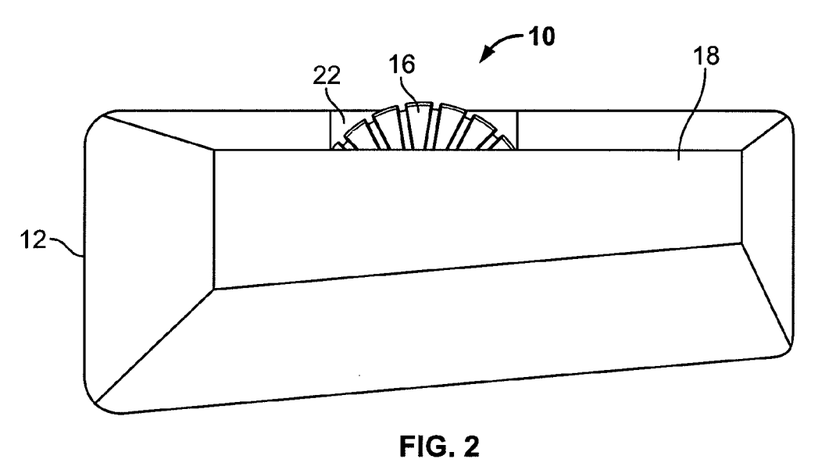
FIG. 2 is a rear view similar to the view shown in FIG. 1, with the USB connector being shown in a retracted position.

FIGS. 1 and 2 illustrate a thumb drive 10 that includes an outer housing 12, a USB connector 14, and an actuator, such as a cylindrical dial 16 or a lever. The dial 16 is sized to move the USB connector 14 to an extended position beyond the outer housing 12 as shown in FIG. 1, when the dial 16 is rotated in one direction. The dial 16 is sized to retract the USB connector 14 into the outer housing 12, as shown in FIG. 2, when the dial 16 is rotated in an opposite direction. The outer housing 12 includes a bottom cover 18 and a top cover 20 (see FIG. 3). The bottom cover 18 has a cut-out 22 formed therein to allow access to a portion of the dial 16. The bottom cover 18 could be configured without the cut-out 22 such that the dial 16 is placed entirely on the outer surface of the bottom cover 18.

Figure 3:
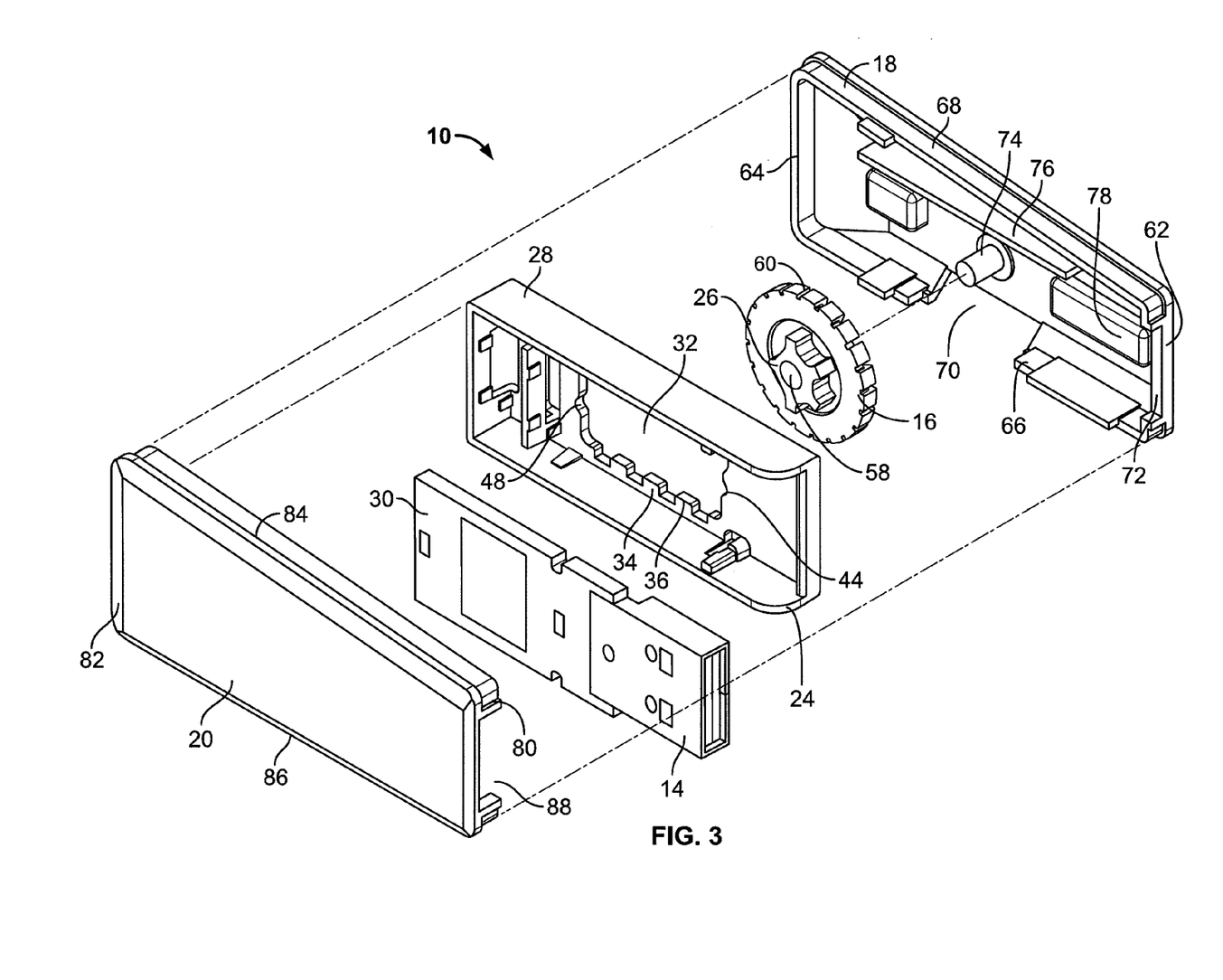
FIG. 3 is an exploded view showing components of the thumb drive, including a top cover, a dial, a pinion, a carrier, a printed circuit board, the USB connector, and a bottom cover.
Figure 6:
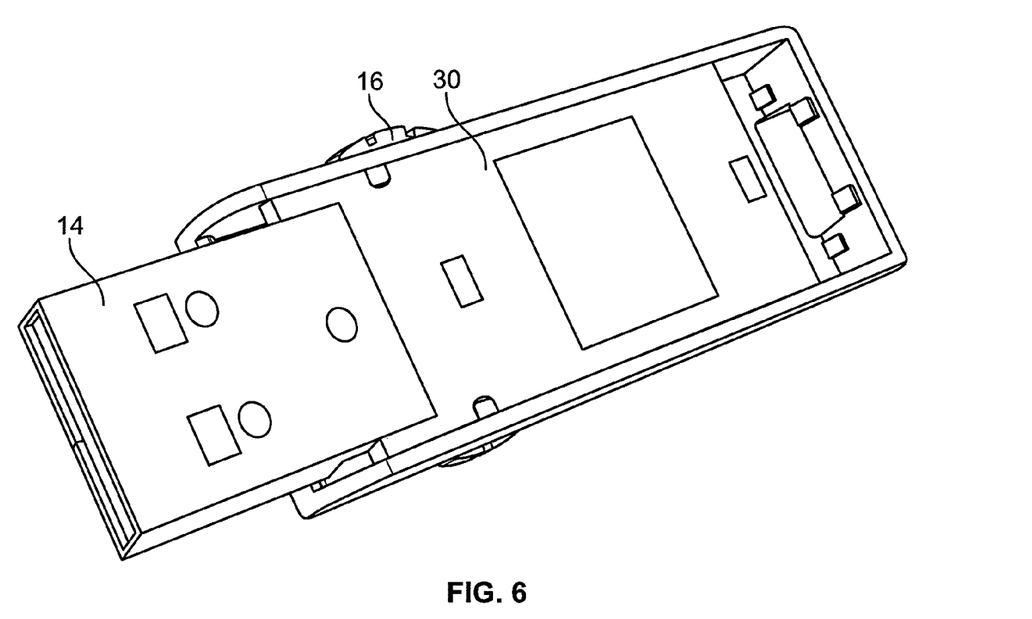
FIG. 6 is a perspective view of a movable carrier assembly with the dial with a USB printed circuit board assembly (PCBA) loaded into the movable carrier assembly.
Figure 7:
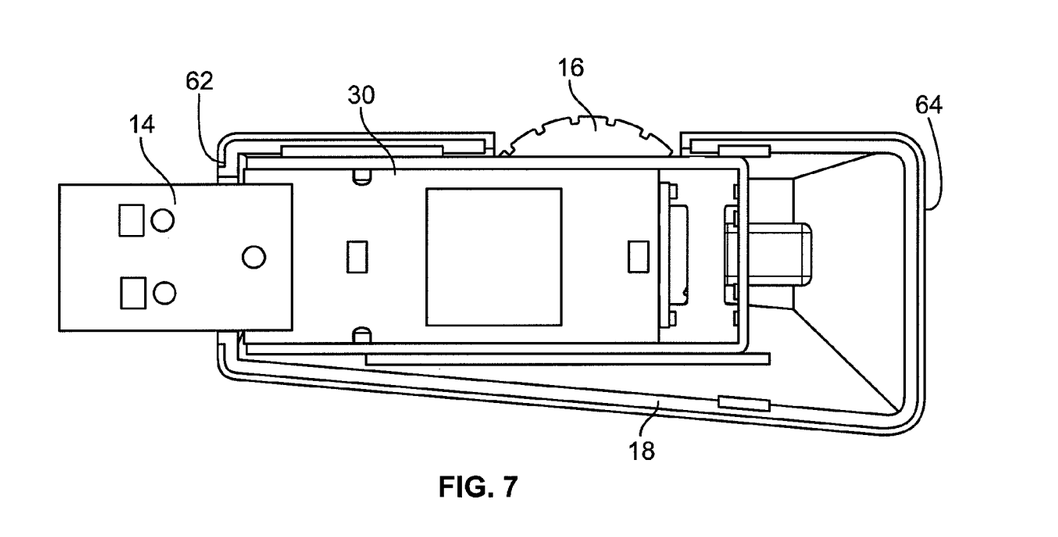
FIG. 7 is a front view of the thumb drive without the top cover.

Referring to FIG. 3, the thumb drive 10 also includes a movable carrier assembly 24 and a pinion 26 located between the bottom cover 18 and the top cover 20. The movable carrier assembly 24 includes a carrier 28, a printed circuit board (PCB) 30, and the USB connector 14 connected to the PCB 30. The PCB 30 and the USB connector 14 are secured to the carrier 28 (see FIGS. 6 and 7) such that the PCB 30 and the USB connector 14 move conjointly with the carrier 28. The PCB 30 includes one or more circuits and other electronic components, such as non-volatile memory or digital flash memory with a capacity of at least 256 Mbytes, which is in electrical contact with the USB connector 14.

The movable carrier assembly 24, which constitutes the carrier 28, the PCB 30, and the USB connector 14, is adapted to move relative to the bottom cover 18 and the top cover 20. Specifically, the movable carrier assembly 24 is adapted to move between a retracted position, in which the USB connector 14 is retracted into the outer housing 12 as shown in FIG. 2, and an extended position, in which the USB connector 14 is extended beyond the outer housing 12 as shown in FIG. 1.

Figure 4:
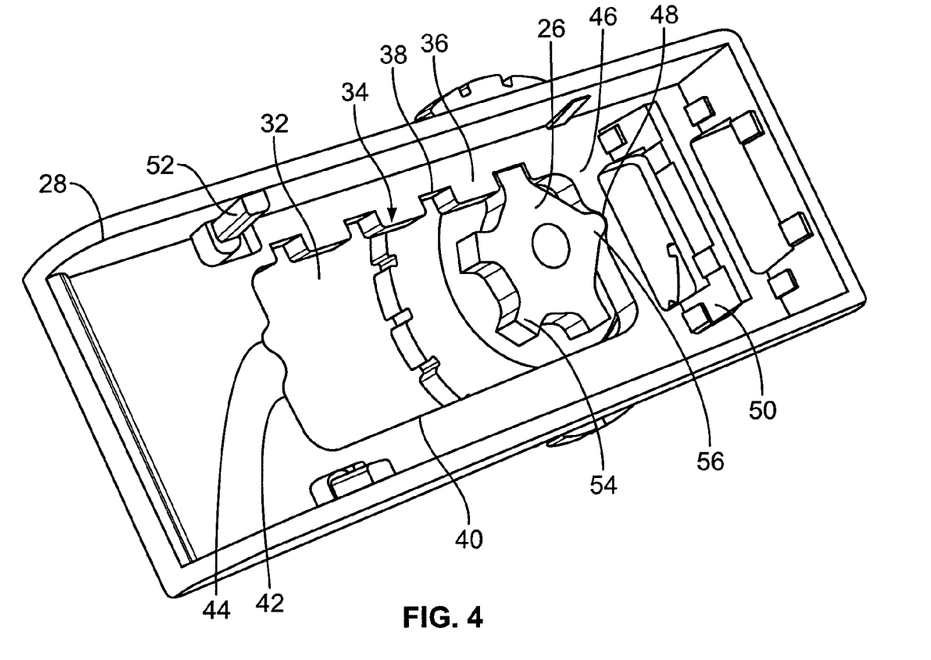
FIG. 4 is a front view of the carrier with the dial and the pinion.

As illustrated in FIG. 4, the carrier 28 includes an opening 32 sized to accommodate the pinion 26. The opening 32 is defined by a rack 34 with a plurality of teeth 36 on one longitudinal edge 38 thereof, an opposite longitudinal edge 40, a first lateral side edge 42 that includes a first notch 44, and a second lateral side edge 46 that includes a second notch 48.

The carrier 28 includes a spacer 50 and a protrusion 52 sized to support the PCB 30 and the USB connector 14.

The pinion 26 is provided with a plurality of tabs 54 and a protrusion 56 circumferentially spaced around the exterior of the pinion 26. While four tabs 54 are shown in FIG. 4, it should be understood that the number of tabs 54 could vary. The tabs 54 are sized to interact with the teeth 36 of the rack 34 while the protrusion 56 is sized to interact with the first notch 44 and the second notch 48, as will be described in further detail hereinafter.

The pinion 26 is mounted to the dial 16 such that the pinion 26 rotates conjointly with the dial 16. Referring to FIG. 3, the pinion 26 and the dial 16 include a center opening 58 formed therein. The dial 16 includes a plurality of grooves 60 designed for allowing a user to attain a firm grip on the dial 16 and to make it easier to rotate the dial 16.

Figure 5:
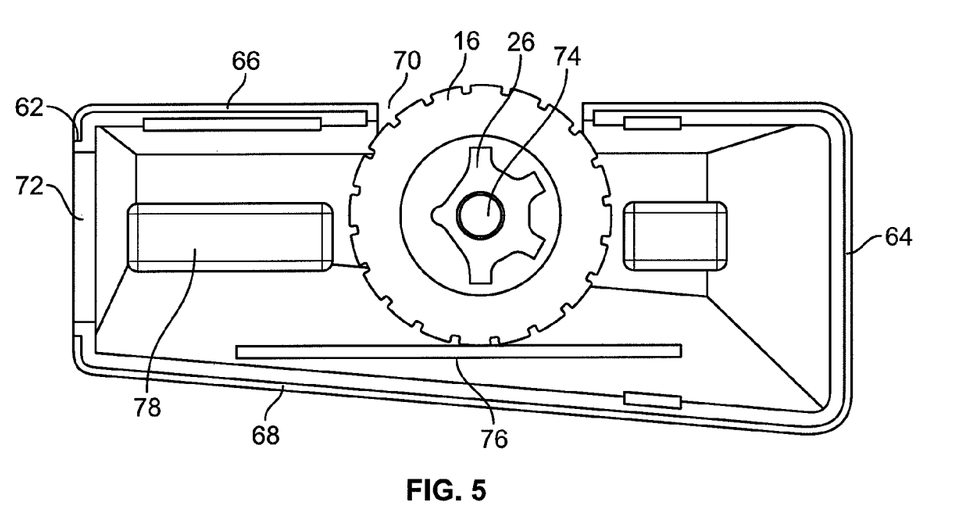
FIG. 5 is a front view of a bottom cover of the thumb drive with the dial and the pinion.

Referring to FIGS. 3 and 5, the bottom cover 18 includes two lateral walls 62, 64 and two longitudinal walls 66, 68. The longitudinal wall 66 has an opening 70, which forms the cut-out 22, to allow access to the dial 16. The lateral wall 62 has an opening 72 formed to allow the USB connector 14 to pass therethrough. The inside face of the bottom cover 18 includes a post 74 (see FIG. 3) sized to accommodate the pinion 26 and the dial 16 through the center opening 58. The pinion 26 and the dial 16 are sized to rotate about the post 74. The engagement of the pinion 26 and the dial 16 to the post 74 prevents linear motion of the pinion 26 and the dial 16. A guide rail 76 guides the movable carrier assembly 24. The inside face of the bottom cover 18 includes spacers 78 sized to support the movable carrier assembly 24.

With reference to FIG. 3, the top cover 20 includes two lateral walls 80, 82 and two longitudinal walls 84, 86. The lateral wall 80 has an opening 88, which cooperates with the opening 72 formed in the bottom cover 18, to allow the USB connector 14 to pass therethrough.

Figure 8A:
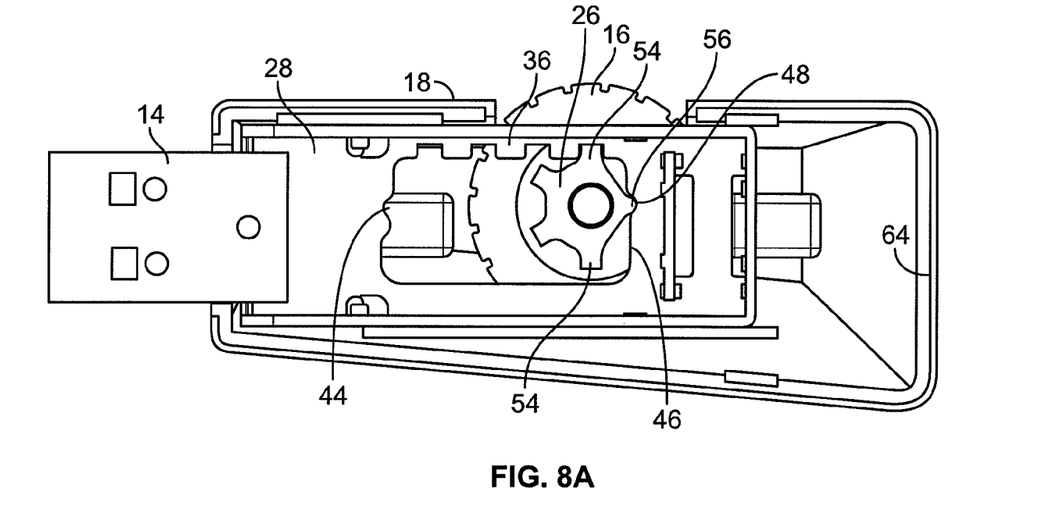
FIG. 8A is a front view of the thumb drive without the top cover, the printed circuit board being removed to show the USB connector and the carrier in an extended position.
Figure 8B:
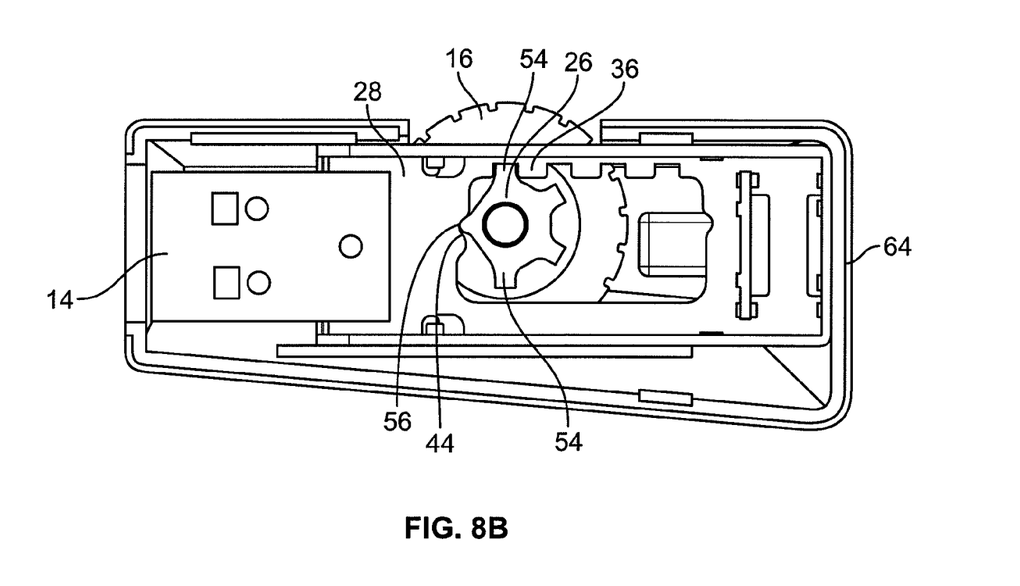
FIG. 8B is a front view similar to the view shown in FIG. 8A, with the USB connector and the carrier being shown in a retracted position.

With reference to FIGS. 4, 8A, and 8B, the pinion 26 and the rack 34 cooperate with each other to induce linear motion of the movable carrier assembly 24 in response to rotational motion of the dial 16. However, any suitable mechanism for inducing linear motion can be utilized.

Specifically, the pinion 26 is sized to engage the teeth 36 of the rack 34. The dial 16 cooperates with the pinion 26 such that when the dial 16 is rotated, the pinion 26 slides over the teeth 36, which moves the movable carrier assembly 24 in a linear direction. Because the USB connector 14 is connected to the movable carrier assembly 24, the USB connector 14 moves along with the movable carrier assembly 24 in the linear direction.

FIG. 8A shows the movable carrier assembly 24 in its extended position such that the USB connector 14 could be used to connect to a USB port on a computer or other host device with a USB connector. The tab 54 of the pinion 26 is engaged to one tooth 36 of the rack 34. The protrusion 56 is caught in the second notch 48 of the second lateral side edge 46 so as to prevent the protrusion 56 from moving in a counterclockwise position (when viewed through the top cover 20). This prevents rotation of the pinion 26 and the dial 16 in a counterclockwise manner. The angle of the second notch 48 allows the protrusion 56 to move in a clockwise position. Alternatively, the present invention could be configured such that the protrusion 56 moves in a counterclockwise manner. Thus, the present invention is not limited by the term "clockwise" or "counterclockwise."

When the dial 16 is rotated in a clockwise manner (with respect to FIG. 8A), the pinion 26 is caused to rotate in the same direction. As the pinion 26 is rotated, the tabs 54 slide over the teeth 36 in a clockwise manner, thereby moving the movable carrier assembly 24 in a linear direction toward the walls 64, 82 of the bottom and top covers 18, 20. The tabs 54 continue to slide over the teeth 36 until the protrusion 56 engages the first notch 44, thereby moving the movable carrier assembly 24 in its retracted position, as shown in FIG. 8B. This places the USB connector 14 in its retracted position. The first notch 44 is sized to preclude further movement of the protrusion 56 in a clockwise manner, thereby preventing further rotation of the pinion 26 and the dial 16 in a clockwise manner.

To move the movable carrier assembly 24 from its retracted position to its extended position, the dial 16 is rotated in a counterclockwise manner. In particular, when the dial 16 is rotated in a counterclockwise manner (with respect to FIG. 8B), the pinion 26 is caused to rotate in the same direction. As the pinion 26 is rotated, the tabs 54 slide over the teeth 36 in a counterclockwise manner, thereby moving the movable carrier assembly 24 in a linear direction away from the walls 64, 82 of the bottom and top covers 18, 20. The tabs 54 continue to slide over the teeth 36 until the protrusion 56 engages the second notch 48, thereby moving the movable carrier assembly 24 in its extended position, as shown in FIG. 8A. This places the USB connector 14 in its extended position. The second notch 48 is sized to preclude further movement of the protrusion 56 in a counterclockwise manner, thereby preventing further rotation of the pinion 26 and the dial 16 in a counterclockwise manner.

Figure 9A:
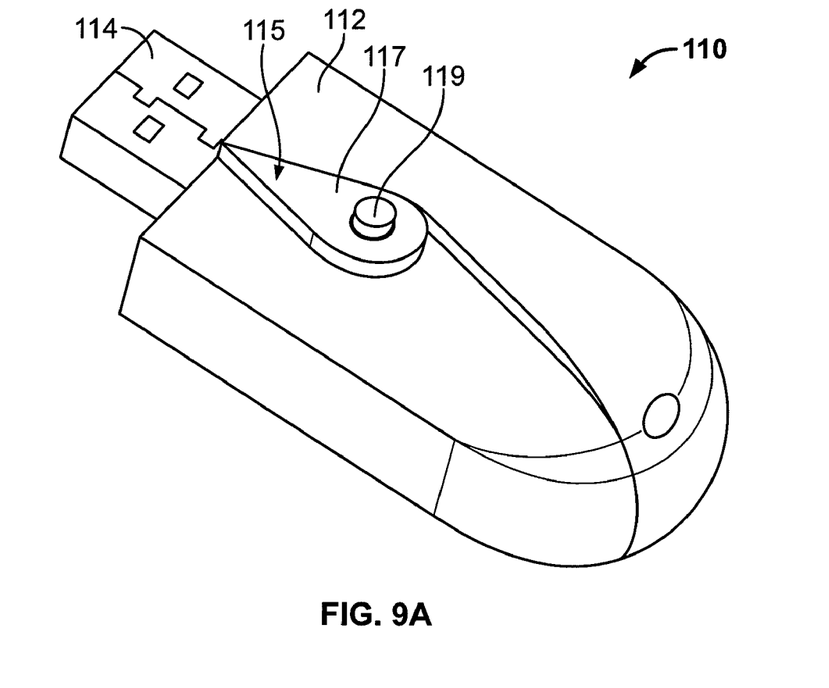
FIG. 9A is a perspective view showing another aspect of a thumb drive, a USB connector being shown in an extended position beyond the outer housing.
Figure 9B:
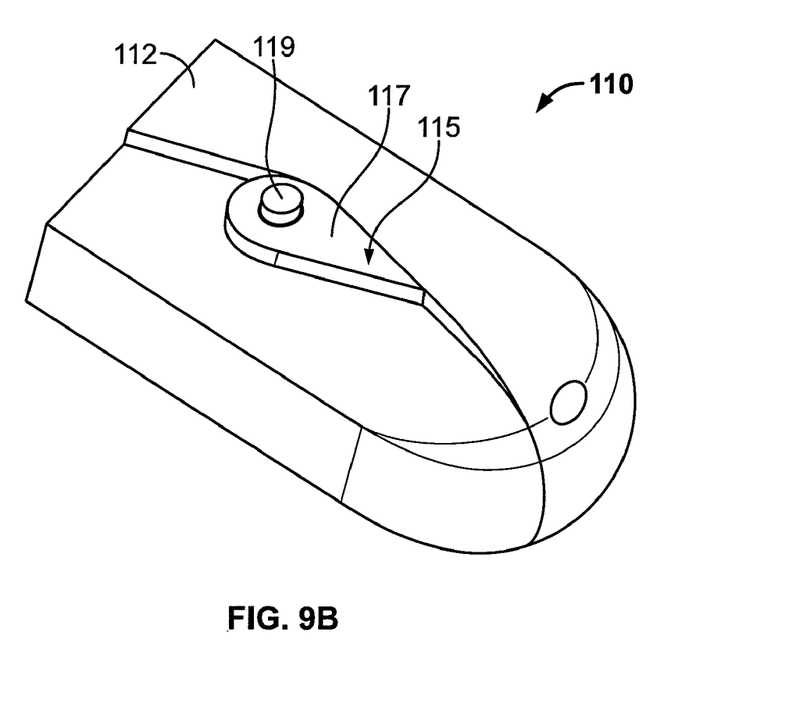
FIG. 9B is a perspective view similar to the view shown in FIG. 9A, with the USB connector being shown in a retracted position.

The USB connector 14 could be retracted and extended by employing other techniques. For example, FIGS. 9A and 9B illustrate a thumb drive 110 that includes an outer housing 112, a USB connector 114 (see FIG. 9A), and an actuator assembly 115, which includes a lever 117 movable about a pivot 119, and a gear 121 (see FIG. 9C). The gear 121 is mounted to the lever 117 such that the gear 121 moves conjointly with the lever 117.

The lever 117 is sized to move the USB connector 114 to an extended position beyond the outer housing 112 as shown in FIG. 9A, when the lever 117 is moved in one direction. The lever 117 is sized to retract the USB connector 114 into the outer housing 112, as shown in FIG. 9B, when the lever 117 is moved in an opposite direction.

Figure 9C:
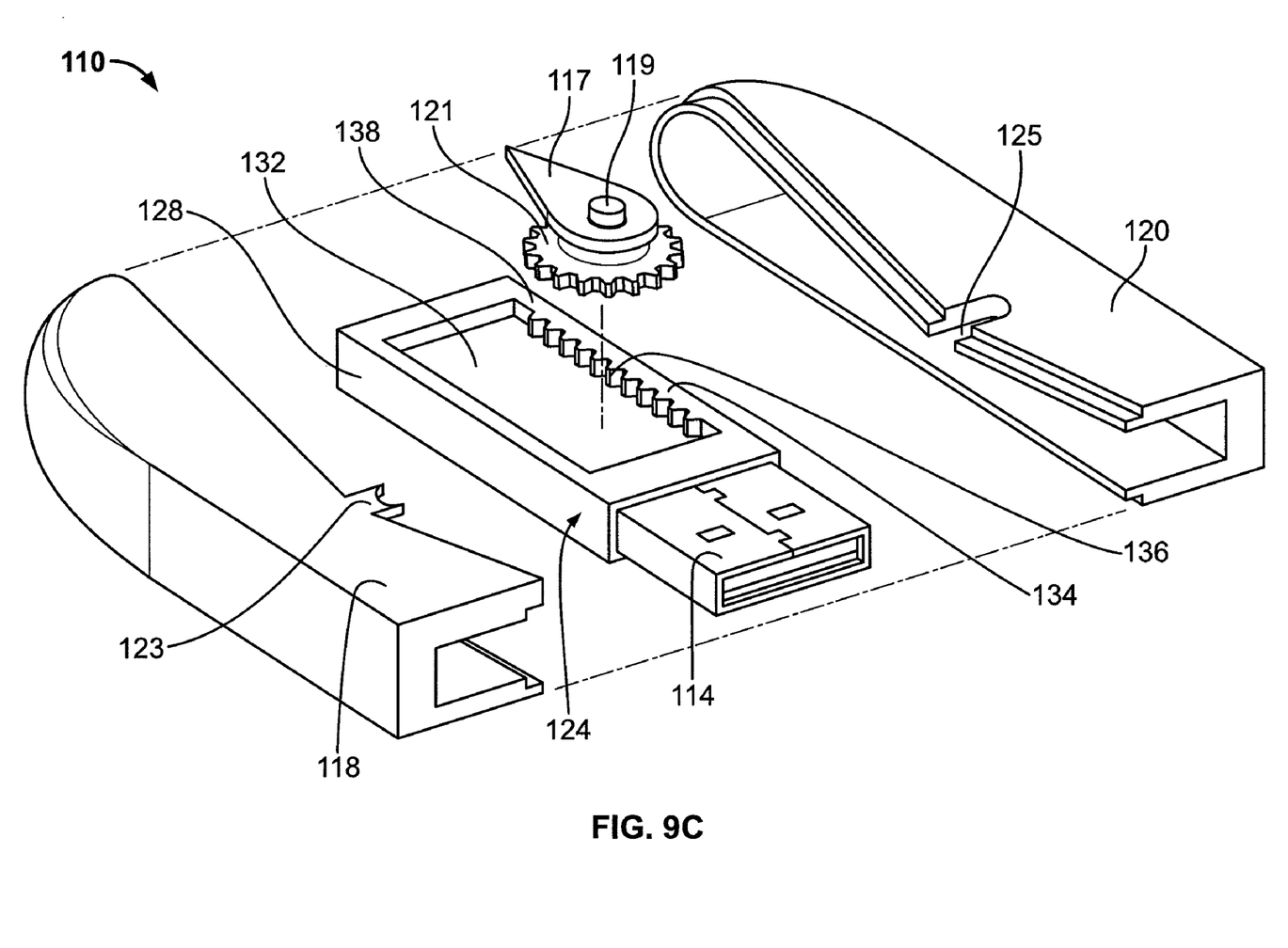
FIG. 9C is an exploded view showing components of the thumb drive, including lateral covers, a lever, a gear, a carrier, and the USB connector.

Referring to FIG. 9C, the outer housing 112 includes a first lateral cover 118 with an arm 123 and a second lateral cover 120 with a recess 125 sized to receive the arm 123. The arm 123 and the recess 125 cooperate to capture the actuator assembly 115.

The thumb drive 110 also includes a movable carrier assembly 124 located between the first lateral cover 118 and the second lateral cover 120. The movable carrier assembly 124 includes a carrier 128, a printed circuit board (PCB) (not shown), and the USB connector 114 connected to the PCB. The PCB and the USB connector 114 are secured to the carrier 128 such that the PCB and the USB connector 114 move conjointly with the carrier 128.

The carrier 128 includes an opening 132 sized to accommodate the gear 121. The opening 132 is defined by a rack 134 with a plurality of teeth 136 on one longitudinal edge 138 thereof. The gear 121 and the rack 134 cooperate with each other to induce linear motion of the movable carrier assembly 124 in response to motion of the lever 117.

Specifically, the gear 121 is sized to engage the teeth 136 of the rack 134. The lever 117 cooperates with the gear 121 such that when the lever 117 is moved, the gear 121 slides over the teeth 136, which moves the movable carrier assembly 124 in a linear direction. Because the USB connector 114 is connected to the movable carrier assembly 124, the USB connector 114 moves along with the movable carrier assembly 124 in the linear direction.

In another embodiment, the thumb drive could include an outer housing that is exposed on one side and open at one end, and a push member connected to an USB connector. The push member is sized to move the USB connector to a position beyond the outer housing when the push member is moved in one direction, and to retract the USB connector into the outer housing when the push member is moved to the opposite direction.

The thumb drive 10, 110 can employ an illumination source (not shown), such as a light bulb or an array of light emitting diodes. The thumb drive 10, 110 could include a door, such as a panel, for the openings 72, 88.

It will be understood that the embodiments described herein are merely exemplary and that a person skilled in the art may make many variations and modifications without departing from the spirit and scope of the invention. All such variations and modifications are intended to be included within the scope of the invention as defined by the appended claims.

What is claimed is:

1. A thumb drive comprising:
    a housing;
    a USB connector sized to translate between an extended position beyond said housing and a retracted position into said housing;
    an actuator sized to actuate said USB connector to move said USB connector between said extended position and said retracted position, said USB connector sized to translate to said extended position when said actuator is moved in one direction, said USB connector sized to translate to said retracted position when said actuator is moved in an opposite direction;
    a rack having a plurality of teeth formed in a longitudinal edge of said rack, said USB connector sized to move conjointly with said rack;
    a pinion having a protrusion and a plurality of tabs, said plurality of tabs sized to engage said teeth, said rack including a notch formed in a lateral side of said rack, said notch sized to engage said protrusion such that when said protrusion engages said notch, said pinion is prevented from rotating in at least one direction;
    wherein said actuator comprises a cylindrical dial sized to rotate, said cylindrical dial accessible through said housing;
    wherein said rack has a second lateral side including a second notch, said second notch having an angle to allow said pinion to move in a single direction; and
    wherein said protrusion of said pinion is sized to engage said second notch of said rack.

2. The thumb drive of claim 1, wherein said pinion is sized to rotate conjointly with said cylindrical dial.

3. The thumb drive of claim 2, wherein said pinion slides over said teeth when said cylindrical dial is rotated.

4. The thumb drive of claim 3, wherein said USB connector translates in a linear motion when said pinion slides over said teeth.

5. The thumb drive of claim 4, wherein said housing includes at least one cover with a post sized to accommodate said cylindrical dial, the engagement of said cylindrical dial to said post prevents linear motion of said cylindrical dial.

6. The thumb drive of claim 5, further comprising a carrier including said rack, said carrier connected to said USB connector and sized to move conjointly with said rack.

7. The thumb drive of claim 6, further comprising memory within said housing for storing information, said memory including at least 256 Mbytes, said memory being in electrical communication with said USB connector.

8. The thumb drive of claim 1, wherein said protrusion and said plurality of tabs are circumferentially spaced around an exterior of said pinion.

9. The thumb drive of claim 8, wherein said notch is u-shaped.

* * * * *